United States Patent Office 3,306,860
Patented Feb. 28, 1967

3,306,860
LIQUID BORIC ACID SUSPENSION, METHOD AND PRODUCTS
Victor M. Rowell, Bay Village, Ohio, and Vernon L. Guyer, Minneapolis, Minn., assignors to Archer-Daniels-Midland Company, Minneapolis, Minn., a corporation of Delaware
No Drawing. Filed May 3, 1962, Ser. No. 192,066
7 Claims. (Cl. 252—432)

This invention relates to stable liquid suspensions of boric acid in excess of solubility, the method of preparing the same and products. More specifically, this invention relates to a method of forming a homogeneous suspension of boric acid or boric oxide in liquids in which boric acid and boric oxide are only slightly soluble and the useful resin and catalyst combinations derived therefrom.

Boric acid has been used as a resin catalyst and hardening agent for both room temperature curing resins and thermosetting resins in the foundry industry for several years. It has most often been used with urea-formaldehyde resins, furfuryl alcohol containing resins, furan type resins, melamineformaldehyde resins, and phenolic resins. It may also be used with other resins containing methylol groups. Further useful applications of a boric acid suspension will become apparent from the disclosure herein.

The reactions of boric acid with the above described resins is not entirely understood. We believe that boric acid has the ability to act as a cross linking agent with methylol groups or when in the presence of methylol groups it catalytically effects this cross linking.

The advantages in using boric acid in the foundry industry have previously been curtailed because of its insolubility in liquids. Therefore it was necessary to use it as a dry powder or to make up a slurry for immediate use. Boric acid is relatively insoluble in water. The solubility as given in Lange's Handbook of Chemistry is 2.66 parts per hundred at 32° F., about 12 parts per hundred at 77° F. and 40.2 parts per hundred at 212° F. Certain polyfunctional alcohols are slightly better solvents. Glycerine appears to be one of the better solvents for boric acid, but even it is not satisfactory being able to dissolve only about 22 parts boric acid per hundred at 77° F. It will therefore be recognized that at operable temperatures, it is difficult to dissolve sufficient boric acid or oxide into solution for practical applications.

When we refer to boric acid we also intend to include boric oxide since in an aqueous solution boric oxide hydrolizes to boric acid and thus they are analogous.

Using boric acid in a mix as a dry powder or in a slurry form has several disadvantages in industrial applications. Insoluble powders are difficult to handle and difficult to completely mix into other ingredients that are not dry. For example, in a sand mix it is difficult to disperse the dry powdered boric acid evenly throughout the sand. These problems are eliminated by the homogeneous liquid suspension herein described.

When boric acid or oxide is used in foundry binders, it is generally used with a urea-formaldehyde resin, furfuryl alcohol containing resins or furan resins. By cross linking these resins it increases the hardness and tensile strength. It also has the advantage of maintaining the tensile strength at the longer cure times and tends to reduce overbake at high temperatures and long curing times. It is best, and often times necessary, to use another acid or proton donor or electron acceptor in combination with the boric acid to promote a faster cure. These acids are generally called accelerators. As an example, a strong acid is used with room temperature curing resins and weak or latent acids are used with thermosetting resins to properly effect their cure.

These resins may be cured in a refractory mix by several different methods. All of these methods are not necessarily suited for every resin. Usually the resin is made specifically for a particular curing procedure.

The first method is the room temperature cure, sometimes incorrectly referred to as an air cure. By this procedure the resin is not cured by oxygenation but by the action of a concentrated strong acid. The strong acid has available protons which react with the resin forming carbonium ions which in turn react with each other thus polymerizing the resin to a hard plastic. The reaction rate is determined by the amount of acid present and by the temperature and size of the core. At room temperature the time will vary to from about one to several hours.

A second method is by baking. This is similar to the procedure used with core oils with the exception that these resins cure much more rapidly and require an acid accelerator. The cores are baked by convection or dielectric heating at a temperature between about 200° F. and 500° F. The refractory mix will contain a resin and a dilute solution of a strong acid or one of the various types of latent acids. The cure time will vary from a few minutes to about an hour depending on the size of the core, the baking temperature and the type of catalyst system.

A third method, and the method most commonly used for large scale production is the hot box method. The refractory mix is made containing a dilute solution of a strong acid or a latent acid. This refractory mix is blown by air pressure into a heated pattern which is at a temperature of about 350° F. to 500° F. The resin cures within a matter of a few seconds. It is then immediately removed from the pattern and allowed to cool.

To produce foundry cores in accordance with this invention, the curable binder is mulled with refractory foundry material and the boric acid liquid suspension and catalyst combination of this invention. The mix is shaped and cured by one of the above described methods thus producing cores and molds which are harder and have higher tensile strengths than those which do not contain boric acid.

In referring to foundry cores, molds are also intended to be included by the term cores. The mold is technically the outer form or pattern and the core is the inner form or pattern. They are both made in the same manner and with the same materials.

An object of this invention therefore, is to provide an improved stable homogeneous boric acid or oxide suspension in a liquid phase and the method therefor and the products derived therefrom.

It is another object of this invention to provide a method of forming a stable liquid suspension of boric acid or oxide at a high concentration level for use as a resin hardener and catalyst.

A further object of this invention is to provide various improved combinations of resin and boric acid suspensions with or without an acid accelerator.

The term "stable" when used in reference to this liquid suspension, is herein intended to refer to the boric acid remaining in a homogeneous state for extended periods, amounting to several weeks or more, under normal storage conditions.

To the accomplishment of the foregoing and related ends, this invention then comprises the features above and as hereinafter more fully described and exemplified and pointed out in the claims. The following description setting forth in detail certain illustrative embodiments of the invention, these being indicative, however, of but a few of the various ways in which the principle of the invention may be employed.

Either boric acid or boric oxide may be used in this invention. Amounts of boric acid or oxide ranging up to about 75% by weight can now be suspended in a liquid medium. Even larger amounts could be suspended if it were so desired. This is many times more than the solubility of boric acid or oxide in the suspending liquid. When water is used as the carrying liquid, the boric acid level would be about 6.2 times its solubility at 77° F. Fluctuation temperatures do not adversely affect this suspension. If amounts larger than about 75% boric acid are used, the product becomes a thick paste which is readily dilutable to any desired concentration in water, glycols or other liquids miscible with the suspending liquid. The thick paste is not practical where a free flowing liquid is desired. Thus it will be apparent that boric acid or oxide can now be made in stable suspensions in excess of its solubility.

The liquid used to suspend the boric acid or oxide could conceivably be any liquid which will not react with boric acid. The preferred carrying liquids are water and alcohols, preferably polyfunctional alcohols like glycerine and ethylene glycol. Water is the most frequently used liquid, even though it has a lower solubility ratio than the glycols, since it is inexpensive and is less likely to interfere with the curing of the resin. Hence, the herein described suspension is readily adaptable for use with water soluble and dispersible resins.

The general procedure in the practice of this invention is as follows: Boric acid or oxide is added to water or any other desired carrying liquid, to which a surfactant and a thickening agent has been added, and is ground by any conventional method to reduce the particle size to less than about 80 microns, with the average size being about 40 to 45 microns. When these ingredients are ground in the proper ratio, the resulting product is a stable homogeneous suspension of boric acid.

This suspension may be used as is or can be diluted with the original carrying liquid or other liquids miscible therein to any desired consistency. Generally, when the suspension is to be used as a catalyst for foundry binders, various amounts of acid accelerators are added to the suspension. These can be easily incorporated into the suspension without adverse effect on its stability. When the herein described suspension containing an acid accelerator is mixed with a resin, the acid accelerator cures the resin very quickly upon heating and, the boric acid provides for higher tensile strength and harder cores than those obtainable without boric acid.

Numerous acid accelerators can be used. Most frequently, latent acids such as ammonium chloride and cyanuric chloride are used or Lewis acids such as aluminum chloride, ferric chloride, zinc chloride, stannic chloride and boron fluoride or various other proton donating or electron accepting compounds. These accelerators may be used singly or in various combinations. The boric acid suspension has a pH in the range of about 5.5 to 6.5. With the addition of the acid accelerators, the pH is usually changed. A low pH, that is about 2.0 to 2.5, results in a lower viscosity than a pH in the range of about 3.0 to 3.5. Thus minor adjustments in viscosity can be made by adjusting the pH by adding a strong acid.

When the core binding resin is one which cures at room temperature, a concentrated strong acid such as $H_3PO_4$ or HCl is used. As indicated, these acids may also be mixed with the suspension of boric acid without adverse effect. This results in a convenient one package catalyst system.

Boric acid powder obtained commercially has been ground to a very small particle size. This powder however, tends to agglomerate and thus requires a further grinding to effect the suspension. The surfactant reduces the agglomeration tendencies of the boric acid particles and thus prevents an increase in particle size. If a surfactant is not used, the particle size will soon increase causing the boric acid to settle out.

The surfactants which have proven most successful are of the anionic and nonionic type. Very limited success was achieved with cationic surfactants. The anionic surfactants such as the dioctyl ester of sodium sulfosuccinic acid and the sodium salts of a carboxylic polyelectrolyte are the preferred materials. These are sold under the trade names of Aerosol OT and Tamol 731 respectively. A water solution containing 70% sorbitol is the preferred nonionic surfactant. The amount of surfactants required is about 0.25% to about 2.0% by weight. The preferred range is about 0.5% to about 1.0% by weight.

Any thickening agent that is not affected by a low pH may be used. Typical examples of such agents are hydroxyethyl cellulose, carboxymethyl cellulose, guar gum, carboxy vinyl polymers and the like. The amount of thickening agent required is about 0.1% to about 1.0% by weight.

The grinding of the boric acid may be accomplished by numerous mechanical devices such as a Waring Blender, Cowles Dissolver, pebble mill, colloid mill and the like. We prefer to use a Cowles Dissolver.

The following examples are given to illustrate but not to limit the invention.

*Example I*

This example illustrates the method of suspending boric acid in a water solution:

The following ingredients were ground in a Cowles Dissolver until a homogeneous paste resulted. All parts are by weight. The particle size averaged about 45 microns.

| | Parts |
|---|---|
| Powdered boric acid | 900 |
| Water | 525 |
| Tamol 371 (25% active) | 45 |
| Hydroxyethyl cellulose QP 15,000 | 6 |

The resulting homogeneous suspension contained 61% boric acid and was thixotropic in nature. The pH was 5.8. The suspension could be used as is or diluted with water so as to obtain a lower level of boric acid or additional acid accelerators could be added as illustrated in Example II.

*Example II*

This example illustrates the method of combining additional acid accelerators into the boric acid suspension and the resulting stable homogeneous liquid. All parts are by weight.

194 parts aluminum chloride (50% water solution), 286 parts urea and 10 parts of 12 molar hydrochloric acid were heated and mixed together at 60° C. until dissolved.

To 800 parts of the boric acid suspension of Example I, the aluminum chloride solution was slowly added while continuously mixing in an Eppenbach Homomixer. At first the viscosity increases rapidly, but then as more $AlCl_3$ solution is added it thins readily.

The final pH was 2.10. By adding more hydrochloric acid the pH was lowered and the viscosity was also lowered. At a pH of 2.10, the boric acid catalyst suspension was a thixotropic liquid which poured readily and remained a stable homogenous liquid for several months.

*Example III*

This example illustrates the use of this invention in preparing foundry molds and cores and further exemplifies the improved tensile strength obtained by using boric acid.

Two said mixes were prepared by the following method: Mix A was prepared by mulling 10,000 parts by weight of Nugent Lake sand, 200 parts by weight of a urea-formaldehyde-furfuryl alcohol resin sold under the trade name of Chem-Rez 100A or the resin of Simmons U.S. Patent No. 2,518,388 and 40 parts by weight of the liquid catalyst prepared in Example II. This mix was then placed in an Osborn Core Blower and AFS tensile briquets were formed and cured therefrom via the hot box method.

Mix B was prepared in the same manner as mix A except that in place of the boric acid liquid catalyst, an equal amount on the active basis of aluminum chloride solution was added to the mix. Tensile briquets were blown in the same manner as mix A.

Table I tabulates the tensile results obtained from mix A and B.

TABLE I

| Cure Temperature, ° F. | Cure Time, Seconds | Tensile Strength, Pounds per square inch | |
| --- | --- | --- | --- |
| | | Mix A | Mix B |
| 350 | 10 | 183 | 123 |
| | 15 | 258 | 240 |
| | 20 | 327 | 308 |
| | 30 | 590 | 409 |
| 425 | 5 | 101 | 52 |
| | 10 | 213 | 177 |
| | 20 | 589 | 358 |
| | 30 | 623 | 471 |
| 500 | 5 | 207 | 135 |
| | 10 | 377 | 240 |
| | 20 | 553 | 389 |
| | 30 | 533 | 415 |

The effect of the boric acid addition in mix A is most pronounced at the longer cure times and at the higher temperatures.

Thus, as the examples have illustrated, boric acid or boric oxide can be suspended in a liquid which simplifies its use in both the foundry industry and other industries which utilize boric acid or oxide. Being able to use a relatively insoluble powder in a stable homogeneous liquid form has numerous advantages such as the ease of dispersing it in other liquids and refractory material, ease of handling, lack of dust and more convenience in measuring, to name but a few of the advantages.

For example, in compounding medicines, soaps, cosmtics and the like, the boric acid or oxide suspension is easily incorporated into creams and solutions at any desired level.

For use in curing foundry binders, there is the added convenience of having a one package catalyst system which contains both the boric acid hardener and an acid accelerator. Inert fillers may also be used.

Other applications of this boric acid or oxide suspension in industries such as plywood, fiberboard and rubber will be apparent to those skilled in the art.

For example, it has been discovered that a more uniform distribution of the boric acid throughout the resins as described, is effected. This results in a more uniformly harder cure throughout the resin mass, with or without an inert filler material. Thus, the described suspension provides new advantages in the resin curing rate and obtains a harder cure throughout.

Having described the present embodiment of our improvement in the art in accordance with the patent statutes, it will be apparent that some modifications and variations as hereinto set forth may be made without departing from the spirit and scope thereof. The specific embodiments described are given by way of examples illustrative of the improvement which is to be limited only by the terms of the appended claims

We claim:

1. A method of suspending boric acid in a carrying liquid at a concentration level above the solubility of boric acid in the said carrying liquid, comprising adding boron maerial selected from the group consisting of boric acid, boron oxide and mixtures of the same to a liquid carrier in an amount in excess of solubility of the said boron material in the said liquid carrier, adding about 0.25% to about 2.0% surfactant by total weight and about 0.1% to about 1.0% thickening agent by total weight, grinding the said ingredients to an average particle size of about 40 to 45 microns with the largest not over about 80 microns, and effecting a stable homogeneous liquid suspension of the said boron material in the said liquid carrier 2. The method of claim 1 wherein, the suspending liquid is selected from the group consisting of water, alcohols and glycols.

3. The method of claim 1 wherein, the surfactant is selected from the group consisting of anionic and nonionic surfactants.

4. A composition comprising a liquid carrier, a boron material selected from the group consisting of boric acid, boron oxide and mixtures thereof, said boron material being suspended in said carrier in a concentration in excess of the solubility of said boron material in said carrier, 0.25 to 2.0% surfactant, and 0.1 to 1.0% thickening agent, said percents being based on the total weight of said composition.

5. The composition according to claim 4 further comprising a resin curing acid catalyst.

6. The composition of claim 5 wherein said catalyst is selected from the group consisting of strong acids, latent acids and Lewis acids.

7. The composition of claim 4 wherein said boron compound has an average particle size of 40 to 45 microns with the largest not over 80 microns, said liquid carrier is selected from the group consisting of water, alcohols and glycols, said surfactant is selected from the group consisting of anionic and nonionic surfactants, and said thickener is selected from the group consisting of hydroxyethyl cellulose, carboxymethyl cellulose, guar gum, and carboxy vinyl polymers.

References Cited by the Examiner

UNITED STATES PATENTS

| | | | |
| --- | --- | --- | --- |
| 2,433,776 | 12/1947 | Marshall | 252—309 |
| 2,726,160 | 12/1955 | Ueltz | 252—363.5 X |
| 3,004,921 | 10/1961 | Stossel | 252—309 |
| 3,006,879 | 10/1961 | Ryan et al. | 260—29.3 |
| 3,025,255 | 3/1962 | Lambuth | 260—29.3 |
| 3,152,909 | 10/1964 | Raffensperger | 252—363.5 X |
| 3,157,986 | 12/1964 | VanNess | 252—363.5 X |

OSCAR R. VERTIZ, *Primary Examiner.*

JAMES A. SEIDLECK, *Examiner.*

E. J. TROJNAR, A. GREIF, *Assistant Examiners.*